United States Patent [19]

Burroway et al.

[11] 4,230,609

[45] Oct. 28, 1980

[54] WATER REDUCIBLE COATING COMPOSITIONS

[75] Inventors: Gary L. Burroway, Doylestown; Michael J. Maximovich, Akron, both of Ohio

[73] Assignee: The Goodyear Tire & Rubber Company, Akron, Ohio

[21] Appl. No.: 910,806

[22] Filed: May 30, 1978

[51] Int. Cl.³ .................. C01D 5/00; C09D 3/74; C09D 3/80

[52] U.S. Cl. .................. 260/29.6 TA; 260/33.2 R; 260/31.4 R

[58] Field of Search .................. 260/29.6 E, 33.2 R, 260/29.6 TA, 32.8 R, 31.4 R

[56] References Cited

U.S. PATENT DOCUMENTS

| | | | |
|---|---|---|---|
| 3,245,932 | 4/1966 | Glavin et al. | 260/29.6 E |
| 3,790,520 | 2/1974 | Ludwig | 260/29.6 E |
| 3,980,602 | 9/1976 | Jakubauskas | 260/29.6 TA |
| 4,064,092 | 12/1977 | Burroway et al. | 526/317 |
| 4,124,555 | 11/1978 | Gross et al. | 260/33.2 R |

OTHER PUBLICATIONS

Goodyear Sales Service Letter No. 256 Jun. 18, 1977.

*Primary Examiner*—Joseph L. Schofer
*Assistant Examiner*—Peter F. Kulkosky
*Attorney, Agent, or Firm*—J. D. Wolfe

[57] ABSTRACT

Copolymers of at least one hydrophobic enhancing monomer (e.g. styrene); at least one monomer selected from the group of acrylates, vinyl ethers, and conjugated dienes; and at least one hydrophillic enhancing organic acid (e.g. acrylic acid) are incorporated into water reducible coating compositions typified by the following formulation:

| Ingredients | Parts by Weight |
|---|---|
| Resin | 25 |
| Volatile Amine | 1.8 |
| Defoamer | 0.1 |
| Water soluble solvent | 5.4 |
| Water insoluble solvent | 1.2 |
| Water | 40 |

The coating compositions of this invention: (1) have low viscosities compared to other water reducible coating compositions; (2) may have a higher solids content than other water reducible compositions; (3) and allow a decrease in the use of volatile organic solvents.

11 Claims, 2 Drawing Figures

WATER REDUCIBLE COATING COMPOSITIONS

BACKGROUND OF THE INVENTION

This invention is in the field of coatings, in particular, water reducible coatings. For purposes of this application, a water reducible coating is defined to be a colloidal dispersion in an organic solvent and water whose resin concentration can be reduced with water or solvent, which when reduced with a coalescing solvent forms a durable coating when applied to a substrate surface. Other names applied to water reducible coatings are water-borne, water solubilized, and water dilutable. This application relates to particular resins and coating compositions formulated with those resins.

A majority of the coating resins commercially used today, are insoluble in water. Therefore, in general practice they have been dissolved in a suitable organic solvent or dispersed in water with the aid of emulsifying or surfactant agents in order to provide a coating composition suitable for application. A serious disadvantage of organic solvent solutions is their inherent potential toxicity, flammability, and environmental pollution.

Many state implementation plans under the Clean Air Act of 1970 have followed the general framework of Rule 66, which was adopted by Los Angeles County, Calif. in 1966 and which greatly limits the quantities of hydrocarbons and photochemical oxidants which may be emitted into the atmosphere.

These regulations are generally addressed to the users of coatings rather than the manufacturer. Coatings manufacture can in general be conducted with little or no emission of solvents into the atmosphere, but the application and curing of these coatings on finished products such as automobiles and refrigerators require the evaporation of large amounts of solvent and thus fall under these regulations.

The most common systems being developed by coatings companies to meet these regulations are waterborne, powder, electrodeposition, high solids, conforming solvents, and polymer-monomer blends for ultraviolet light cure type of coatings. Although very few waterborne coatings are devoid of organic solvents, several of the state regulations have exempted water-thinned coatings which contain 20 percent or less volatile nonexempt material.

Aqueous dispersion or latex-type coatings contain high molecular weight polymers dispersed as an emulsion in an aqueous medium. Generally, acrylic latex coatings exhibit excellent toughness, good chemical and water resistance and excellent durability. However, the use in industrial coatings has been limited because of certain disadvantages (external thickener required for viscosity control, poor pigment dispersability, low gloss, foaming, complex formulation, and substrate wetting problems). Also, such water dispersions, when used to prepare coatings, generally require additional hardeners to overcome residual emulsifiers and curatives to crosslink the resin where water insoluble coatings are desired. Otherwise, such coatings prepared from a water dispersion would simply bleed away with a water wash.

Water reducible polymers contain polar groups, which impart a degree of solubility. They are hybrids of emulsion polymers and solution polymers since they possess properties characteristic of both types. The affinity of the resin for water is controlled by the extent of solvation of the polar groups (carboxylic acid moieties in the case of acrylic polymers) in the polymer backbone. Solvation is achieved by pH adjustment and/or the addition of a water miscible polar cosolvent. Water reducible resins can be alkali soluble (containing acidic groups), acid soluble (containing basic groups), or nonionic (containing amide or hydroxyl groups in conjunction with either acid or basic components). The resins of this invention are of the alkali-soluble type.

Coatings made from the water-reducible resins have advantages over emulsion type coatings. They have better flow and leveling characteristics. Pigment dispersibility is easier. Formulation of the coating composition is not as complex, and gloss of the final coating is higher. Another important benefit of the water reducible type of coating is that it may be formed without substantial amounts of surfactant or emulsifying agents, which in large amounts can inhibit the physical properties of the final coating.

Representative of the types of resins presently utilized in water reducible coatings are: alkyd, styrene acrylics, acrylics, and polyesters. This invention is concerned with the acrylic type of resin. Acrylic water reducible resins having both hard and soft segments and to which a plasticizer is added are disclosed in U.S. Pat. No. 4,064,092, of which there are two divisional applications on file (Ser. Nos. 827,196 and 827,037, now allowed, both filed Aug. 23, 1977).

Both the resins and coating formulations described herein represent an improvement over those in U.S. Pat. No. 4,064,092. The coating compositions described in that patent comprise: a resin, a coalescing solvent, plasticizer, a volatile amine, and water in stated proportions and mixed in a certain manner.

The following improvements over U.S. Pat. No. 4,064,092 were found to be desirable:
(1) lower solvent cost;
(2) lower the amount of organic solvent used (20/80 volume ratio of coalescing solvent to water specified at column 9, lines 20–21 of referenced patent) to decrease atmospheric pollution;
(3) lower phase inversion viscosity; the point at which the mixture of resin, amine, defoamer, and organic solvent (to which mixture water is being added) changes from a water-in-oil dispersion to an oil-in-water dispersion. This would make mixing easier and would require less energy to make up the composition;
(4) increase the solids content of the composition, to give coatings offering improved protection to substrate surfaces, without at the same time thickening the material and making it difficult to apply;
(5) decrease plasticizer content because in some applications plasticizer can be detrimental to the coating, being extractable from the coatings by solvents;
(6) decrease carboxyl group content of the resin to decrease further the water sensitivity of the final coating.

In attacking the above problems, a significant technique has been discovered for controlling the rheology of water reducible compositions.

SUMMARY OF THE INVENTION

It has been found that the use of water insoluble solvent, in addition to water soluble or coalescing solvent, along with certain other modifications, achieves the improvements listed above.

The improved coating composition of this invention comprises:

A. a resin which consists essentially of, based on 100 weight percent of monomeric units within the resin
 1. at least one hard hydrophobic enhancing monomer selected from styrene, α-methyl styrene, acrylonitrile, vinyl toluene, methyl methacrylate, vinyl chloride and vinylidene chloride;
 2. at least one soft hydrophobic enhancing monomer selected from at least one acrylate selected from methyl acrylate, ethyl acrylate, butyl acrylate, 2-ethylhexyl acrylate, lauryl acrylate, isodecyl methacrylate, butyl methacrylate, isobutyl methacrylate, at least one vinyl ether selected from ethyl, butyl, octyl, decyl, and cetyl vinyl ether and/or at least one diene selected from 1,3-butadiene, isoprene and 2,3-dimethyl butadiene, provided that said dienes of monomer part (2) are not mixed together and copolymerized with vinyl chloride or vinylidene chloride; and
 3. at least one hydrophilic enhancing organic acid selected from acrylic, methacrylic, fumaric, itaconic and maleic acid;
B. a water soluble solvent selected from ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, dipropylene-glycol methyl ether, methyl ethyl ketone, propylene glycol ethyl ether, propylene glycol isopropyl ether, propylene glycol butyl ether, acetone, methyl propyl ketone and diacetone alcohol;
C. a plasticizer having a melting point of about −40° C. to about 25° C., a boiling point of at least 95° C. and a solubility parameter of about 8 to about 16;
D. a volatile amine in sufficient amount to result in a pH of from 8 to 14 for the composition;
E. water in a volume ratio to the other volatile components of at least 80:20;
F. defoamer; the improvement which comprises those compositions:
 1. which are further comprised of a water insoluble organic solvent;
 2. wherein the weight ratio of water insoluble organic solvent to water soluble solvent is from 70:30 to 20:80;
 3. wherein the plasticizer is present in an amount ranging from 0 to 30 parts per 100 parts resin; and
 4. wherein the monomers in the resin are present in the following proportions (by weight):

| | |
|---|---|
| hard monomer from group A.1. | 64.5–84.5; |
| soft monomer from group A.2. | 15–35; |
| organic acid from group A.3. | 0.5–10. |

The resins of this invention can be produced by reaction of the monomers in an aqueous emulsion medium. The principles of emulsion polymerization are discussed in the following references: *Synthetic Rubber*, WHITBY G. S., ed., John Wiley & Sons, 1954, Ch. 8; *Emulsion Polymerization*, Bovey F. A. et. al., Vol. IX of *High Polymers*, Interscience Publishers, Inc., 1955; and U.S. Pat. No. 3,714,122, col. 5, lines 41-67 and col. 6, lines 11-59.

Emulsion polymerization generally is well understood in the art. The polymerization reaction between the monomers is carried out in the finely divided monomer droplets obtained by mechanical stirring under the action of emulsifiers or surfactants which form a film around these droplets. Free radical catalysts are used, and pH and temperature are controlled during the reaction. The pH can simply be adjusted with an inorganic base such as a base selected from sodium hydroxide, potassium hydroxide and ammonium hydroxide. Reaction temperature usually ranges between 5° and 80° C. Modifiers such as mercaptans and divinylbenzene are often used to control polymer chain growth or average molecular weight.

In the synthesis of the resins of this invention the monomers are mixed with water, surfactants, chelating agents, modifier, and a free radical catalyst. These ingredients are mixed and reacted at approximately 50°–60° C., pH of from 2 to 7 (preferably 2.5 to 6), and generally for a time of between 6 and 16 hours.

The resins of this invention may be recovered by coagulation techniques which are common in the emulsion polymerization industry. Depending upon the character of the resin a proper coagulant and proper coagulating conditions are chosen. The reaction product mixture (after possible removal of unreacted monomer by steam stripping or other suitable technique) is mixed with a coagulant in water with agitation in order to form a slurry of resin particles. The resin slurry thus obtained may be filtered and the filter cake dried in conventional resin processing equipment. In experimental work for this invention, coagulations were done with a mixture of aluminum sulfate and sulfuric acid in water at a temperature ranging from about 60° C. to 85° C., and the resin was dried in air at about 60° C.

The starting material for the water reducible compositions is preferably the dried resin described above; however, the emulsion reaction product from the resin formation reaction can be used directly without intermediate coagulation and drying steps. In such an operation, the composite would automatically be in a water reduced form, when sufficient amine is used.

The molecular weight for these resins is close to that of resins for oil base paints. This is significant since many recently evolved alternatives to solvent soluble resins are significantly lower in molecular weight and hence physical properties of the resultant coating are compromised.

The resin is actually made water reducible by neutralizing the carboxyl groups with a suitable volatile amine. It is the neutralized carboxylic acid groups which give the resin affinity for water and actually suspend the resin between both the solvent phase and the water phase. Said amine is selected from primary, secondary, and tertiary amines having a melting point in the range of about −40° C. to about 25° C. and a boiling point in the range of about 50° C. to about 150° C. The amine must be a strong amine such as dimethylethanolamine, triethylamine, or blends of such strong amines. With amine neutralization, the resin polymer will behave like a partial electrolyte and demonstrate a high water tolerance.

The coating compositions of this invention can be made by dissolving the resin in the presence of water, which is accomplished by: (1) mixing the dry resin with water to wet it and form a colloidal dispersion and then adding the organic solvents, amine and defoamer; or (2) mixing the dry resin under strong agitation with all the other ingredients.

As an alternative to dissolving the resin in the presence of water, the inversion method may be used. This consists essentially of dissolving the dry resin first in the organic solvents; adding the amine to neutralize the resin; and then adding the water in the proper amount. In the course of adding the water, the system goes through the inversion from a water-in-organic dispersion to an organic-in-water dispersion. In going through this inversion, the viscosity increases as the volume percent water increases up to a certain point (called the inversion point) and then decreases rapidly to level off, generally at volume percent water of greater than 80 percent of the total solvent.

With the improvement of this invention, the level of total volatile organic solvent can be reduced from about 20 volume percent (U.S. Pat. No. 4,064,092) to about 10 volume percent with the use of the solvent mixtures and plasticizer as specified. Also, the use of the improved compositions of this invention facilitates dissolving the resins in the presence of water.

Above about 75 volume percent water, the use of defoamer in small amounts is necessary in order to properly disperse the resins in water.

These coating compositions may be mixed with other normal paint ingredients such as pigments, oils and thickeners.

The actual mechanism of water reducible resins is not thoroughly understood; however, a substantially water insoluble coating is provided on a substrate by application of a coating composition of this invention and drying the applied coating to remove the water, amine, and organic solvents. Application is by any of the conventional techniques such as brushing or spraying. The thickness of the applied coating should generally be in the range of about 1 to about 30 mils (0.025–0.762 mm). The water, amine and organic solvents are evaporated from applied coatings usually at a temperature in the range of about 20° C. to about 80° C.

The choice of organic solvents (water soluble and insoluble) is particularly useful for adjusting the drying rate of the water reduced system. Since water, by itself is a relatively slow evaporating medium, it may sometimes be desirable to increase its drying rate. By blending various organic solvents with water to create low boiling azeotropes almost any dry time can be obtained. Films formed by applying the coating compositions of this invention to substrates are generally dried for a period of from about 15 minutes to about 24 hours.

Typical uses for coatings of this type are highway traffic paints, highly pigmented coatings such as basement sealers, and concrete curing membranes.

DESCRIPTION OF THE PREFERRED EMBODIMENTS

Figure 1:
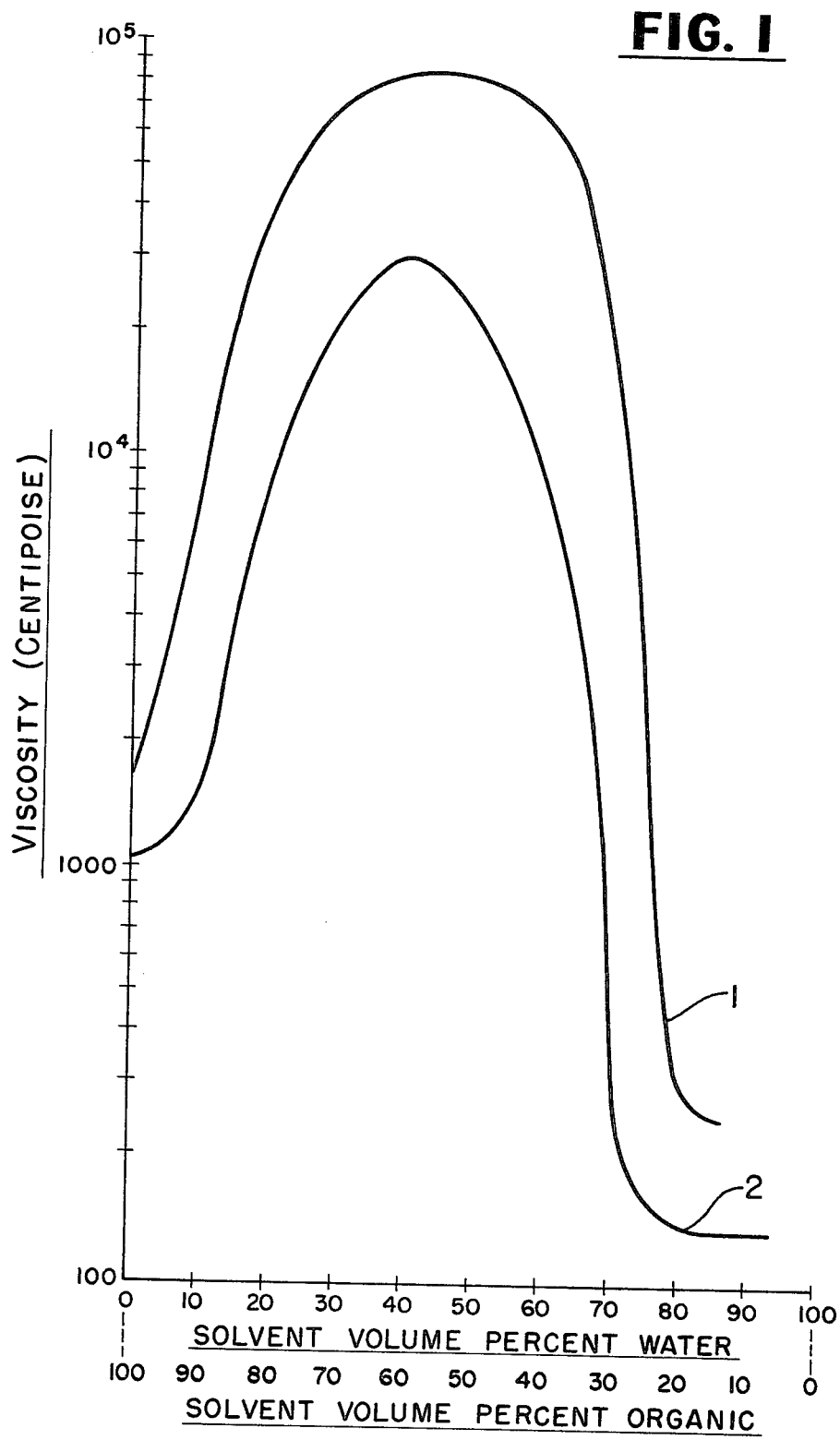

The preferred resins are those which have the following compositions (given in parts by weight):

| hard monomer from group A.1. | 71–84.5 |
| soft monomer from group A.2. | 15–27 |
| organic acid from group A.3. | 0.5–2. |

The lower acid levels are desirable for decreased water sensitivity of the final coating. The use of a blend of organic solvents (water soluble and water insoluble) is necessary in the case of these low acid resins. Without this solvent blend, they would not dissolve in the presence of water.

It is preferable to perform the polymerization so that the carboxylic acid groups are at spaced intervals along the resin polymer chain. In batch reactions, faster reacting monomers (e.g. methacrylic acid) may react more quickly than the other monomers, forming some polymer molecules which are relatively high in that particular monomeric unit and others which are low. The carboxyl groups are thus said to be "blocked" as opposed to being evenly distributed.

The desirable spaced intervals can be achieved by the technique of continuous monomer addition which is well known in the polymerization field. Examples of it are in U.S. Pat. Nos. 3,324,066 and 3,966,661. The emulsion polymerization is carried out by:

(1) forming an aqueous dispersion of an initial monomeric increment of just a part of the total charge (e.g. 5–20 percent of the monomers);

(2) subjecting said dispersion to catalytic and thermal conditions sufficient to induce polymerization; and then (3) adding incrementally or continuously (e.g. 8–16 percent per hour) the remainder of the monomers to said dispersion along with catalyst and emulsifier.

Another technique for maintaining the spaced intervals is to use a mixture of acrylic and methacrylic acids as the organic acid in a batch reaction system. Acrylic acid reacts more slowly than methacrylic acid and therefore helps to "spread out" the carbonyl groups in the polymer. This method is not quite as effective as continuous monomer addition.

The resin synthesis will be further clarified by a consideration of the following example, which is intended to be purely exemplary of the polymerization. Unless otherwise stated, parts are parts by weight.

EXAMPLE I

Polymerizations were carried out in a closed laboratory reactor with agitation. For each batch, the reactor was evacuated, and the ingredients were transferred to the reactor by vacuum. After the charge, the reactor was again evacuated five minutes and then pressurized to 10 psi (68.9 kPa) with nitrogen. Initial polymerization temperature was about 52° C. and was allowed to rise to about 57° C. at 30–32 percent solids. Percent solids was checked at two-hour intervals. Reaction ingredients, conditions, and final product characteristics for a set of typical reactions are given in Table 1, and final product characteristics are given in Table 1.

TABLE 1

| INGREDIENTS (in parts) | Sample No. 2058 | 2048 | 1967 | 1965 |
|---|---|---|---|---|
| Water | 190.0 | 190.0 | 148.0*** | 148.0 |
| Emulsifier | 3.0* | 3.0** | 3.0* | 3.0* |
| Metal Complexing Agent | | 0.05 | 0.1 | 0.1 |
| Sodium Acid Pyrophosphate | | 0.1 | 0.2 | 0.2 |
| $K_2S_2O_8$ (free radical catalyst) | 0.15 | 0.15 | 0.1 | 0.1 |
| Tert.-Mercaptan | 0.8 | 0.8 | 0.8*** | 0.8 |
| Styrene | 71.0 | 71.0 | 70.5 | 72.0 |
| Butyl Acrylate | 27.0 | 26.0 | 26.0 | 27.0 |
| Methacrylic Acid | | 1.0 | 3.5 | |
| Acrylic Acid | 2.0 | 2.0 | | 1.0 |
| Final % Solids | 34.3 | 34.7 | 40.0 | 39.6 |
| Final pH | 2.5 | 4.2 | 5.2 | 4.0 |
| Final Viscosity (cps) | 30 | 28 | 24 | 18 |
| Reaction Time (hrs) | 6.5 | 6 | 7 | 8 |

*Complex surfactant phosphate ester acid neutralized with NaOH to pH = 6.5, except pH = 3.0 for resin 2058. Surfactant used herein was Gafac RE-410, a trademark of GAF Corporation for 2058, 1967 and 1965.
**Linear alkyl sulfonate treated with $NH_4OH$ to pH = 6.5.
***2.0 parts water and 0.4 parts of the mercaptan added at 20–22% solids.

The resins produced in Example I above were separated from the reaction product mixtures by coagulation and drying. The coagulant in each case was a mixture of about 20 grams alum (aluminum sulfate), about 5 grams sulfuric acid, about 10,000 milliliters of water. The temperature of the coagulation was about 50°–60° C. The slurry resulting from each coagulation was filtered using a cloth-lined Buchner funnel. After filtration, each resin cake was washed twice with cold soft water and then dried at 60° C. in an oven.

Of the various water soluble solvents which can be used, generally the ethylene glycol monobutyl ether, ethylene glycol monoethyl ether, diethylene glycol monomethyl ether, diethylene glycol monoethyl ether and diethylene glycol monobutyl ether are preferred.

Representative of the various volatile amines which may be used to form the water reducible compositions are: primary amines such as ethyl amine, propyl amine, butyl amine, isoamyl amine, amyl amine, hexyl amine, heptyl amine and ethanol amine; secondary amines such as diethyl amine, ethyl ethanol amine, and morpholine; and tertiary amines such as dimethylethanol amine, trimethyl amine, triethylamine and N-methyl morpholine. Sufficient amine is added to achieve a pH in the final water dispersion of from about 8 to about 14, preferably 9.0 to 10.0.

The water insoluble solvent is generally selected from the group consisting of mineral spirits, ketones (e.g. methyl isobutyl ketone, MIBK), aromatic cycloparaffins, esters and acetates. It is either a true solvent for the resin or forms a true solvent for the resin when it is mixed with the water soluble solvent.

Each water reducible coating composition has a characteristic curve of viscosity versus volume percent water in the solvent. Here solvent is defined to be the mixture of water with volatile organic solvent. The volatile components of the coating composition are those which evaporate after application of the coating. The shape of this characteristic curve can be changed by changing such factors as percent solids concentration and the type and amount of plasticizer used. It has now been found that the use of water insoluble organic solvent along with water soluble solvent and water can dramatically lower the peak of this characteristic curve which represents the inversion point.

This phenomenon can be seen in FIG. 1. The coating compositions for both curves is given in Table 2.

TABLE 2

|  | Curve (1) | Curve (2) |
|---|---|---|
| Resin (71 parts styrene, 26 parts butyl acrylate, 2 parts acrylic acid, 1 part methacrylic acid, see Table 1 Resin 2048) | 24.9g | 24.9g |
| Wetting Agent (2,4,7,9-tetramethyl-5-decyne-4,7-diol) | 0.1g | 0.1g |
| Triethylamine | 2.5cc | 2.5cc |
| Water | Variable | Variable |
| Water Insoluble/Water Soluble Solvent | " | " |
| Weight Ratio of Water Insoluble to Water Soluble Solvent | 0/100 | 20/80 |
| *Plasticizer, butyl benzyl phthalate | 5.61g | 5.61g |
| Solids (grams/50 cc) | 30.61–30.76 | 30.61–30.76 |

Water insoluble solvent = MIBK; water soluble solvent = ethylene glycol monobutyl ether; Defoamer (Nopco NDW, a trademark of Diamond Shamrock Corp.) used in small amounts (0.075–0.15g) above 75 volume percent water. It is part of solids content and is the reason why solids is expressed as a range.
*Obtained as Santicizer 160, a trademark of Monsanto Industrial Chemicals Co., included in solids.

In the above table and in Table 3, the resins being studied were ground through a 35 mesh screen since no mechanical force was to be used to disperse the resins in the aqueous-organic media. To a tared 4-oz. bottle was added the resin and wetting agent. The water, amine and solvents were added using syringes in order to minamize error. It was always better to wet resins with a nonsolvent before adding a true solvent to prevent agglomeration of the fine particles. When plasticizer was added to the system it was always added last. Santicizer 160 is a liquid and it was easily added using a syringe.

As the volume percent of water, which is part of the solution, approached 80 percent, additional defoamer was required. Since Nopco NDW did not have a solvency effect on the resin it was chosen. Nopco NDW was added dropwise until the system defoamed properly.

The bottles were capped and rolled overnight on a can roller. The apparent viscosity was measured on the following day within 1 or 2 hours from the time agitation was stopped. The viscosity was determined at 20 rpm on a Brookfield Viscometer Model RVF.

The peak for curve (1) is about 85,000 centipoises; whereas, that for curve (2) is about 30,000 centipoises. The only difference between the compositions for curves (1) and (2) is that curve (2) utilizes a 20/80 ratio of water insoluble to water soluble solvent; whereas, curve (1) utilizes only a water soluble solvent. In addition to lowering the curve, it has been found that lower organic solvent levels have been made possible through the use of the 2-part organic solvent. For example, 24.9 grams of the resin of Table 2 was dispersed in a mixture of water and 2-part organic in a 90:10 volume ratio of water to organic; whereas, with the 1-part organic, the highest ratio in which the same amount of resin could be dispersed was 85:15 water to organic. Any composition which can significantly reduce the percentage of organic solvents required is of environmental benefit.

Taking note the general configuration of the viscosity curve, the water reducible compositions used in paints are normally on the part of the curve to the right of 80 volume percent water on the abscissa. For any given water reducible composition, at the same percent solids, the viscosity with the 2-solvent system will be lower than that of the 1-solvent system (U.S. Pat. No. 4,064,092). Therefore, it is possible to have the same viscosity as the older compositions (i.e. within a range which is easy to work with) and have at the same time a higher solids content. Higher solids content implies a coating which would offer better protection for whatever surface is coated.

Figure 2:
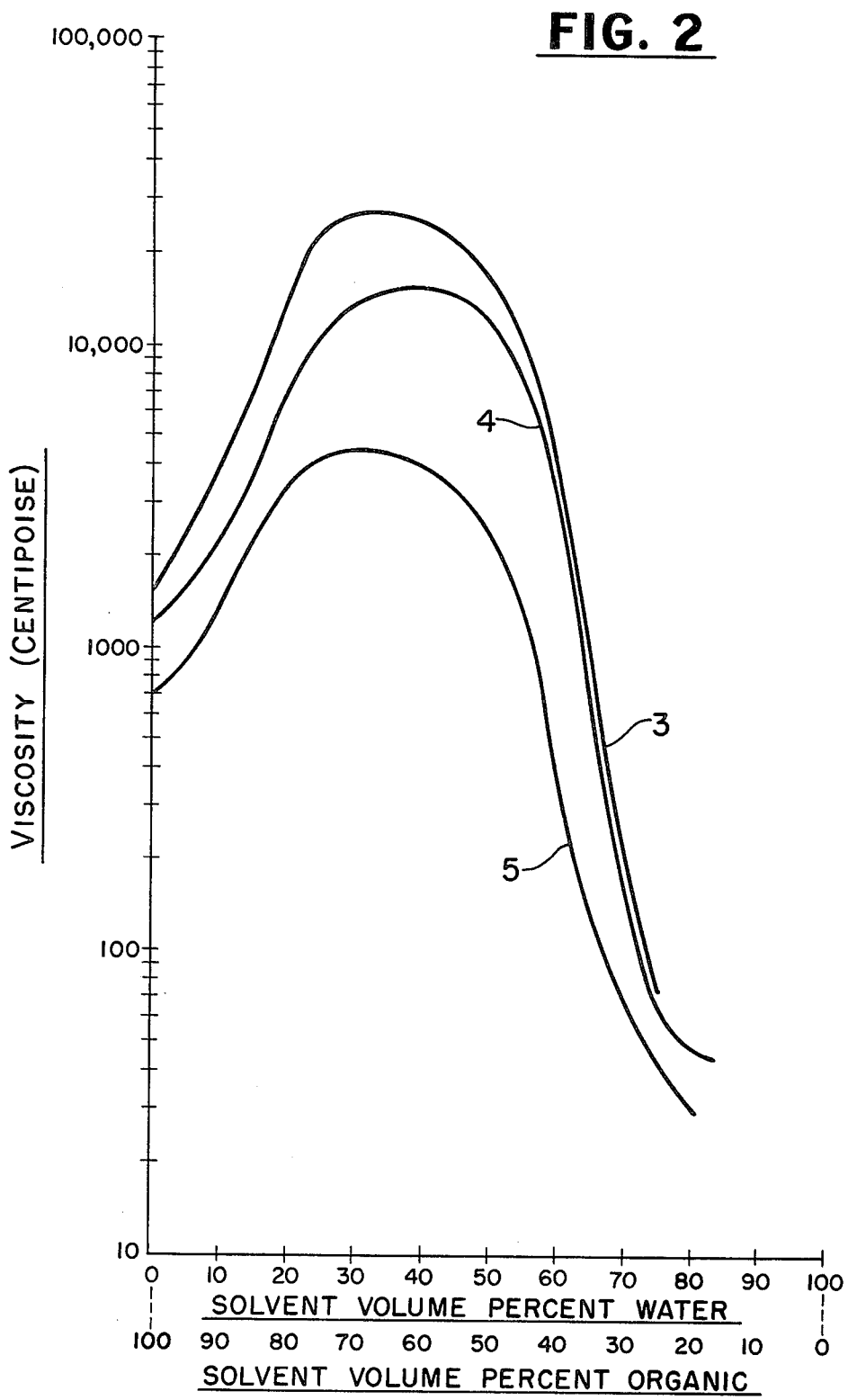

Several other benefits resulting from the present improvement are illustrated by FIG. 2. The compositions which curves (3), (4) and (5) represent are given in Table 3.

TABLE 3

|  | Curve (3) | Curve (4) | Curve (5) |
|---|---|---|---|
| Resin (71 parts styrene, 27 parts butyl acrylate, 2 parts acrylic acid, see Table 1, Resin 2058) | 24.9g | 24.9g | 24.9g |
| Wetting agent (2,4,7,9-tetramethyl-5-decyne-4,7-diol) | 0.1g | 0.1g | 0.1g |
| Triethylamine | 2.5cc | 2.5cc | 2.5cc |
| Water | Variable | Variable | Variable |
| MIBK/Ethylene Glycol Monobutyl Ether | Variable | Variable | Variable |
| Weight ratio MIBK/Ethylene Glycol Monobutyl Ether | 20/80 | 20/80 | 50/50 |
| Plasticizer butyl benzyl phthalate |  | 5.61g |  |

TABLE 3-continued

|  | Curve (3) | Curve (4) | Curve (5) |
|---|---|---|---|
| Solids (grams/50 cc) | 24–25.15 | 30.61–30.76 | 25–25.15 |

Defoamer (Nopco NDW, a trademark of Diamond Shamrock Corp.) used in small amounts (0.075–0.15g) above 75 volume percent water.

The significant difference between curves (5) and (3) is evident. Curve (5) is lower than curve (3) and it extends further to the right. The lowering of the curve implies an easier mixing and easier application of the composition. Also, there is a lower energy requirement for such operations as mixing and pumping the composition with a lower viscosity. The extension of the curve to the right means that lower organic solvents levels are possible. It also shows that an increase in water insoluble solvents makes the resins more soluble in the presence of water to form colloidal dispersions. As can be seen from Table 3, these advantages are brought about by merely increasing the ratio of water insoluble solvent to water soluble solvent from 20/80 to 50/50.

The difference between curves (4) and (3) is not as great, however, it serves to illustrate the further advantages which may be obtained through the judicious use of plasticizer. In combination with the 2-solvent system, the plasticizer may be used to not only lower the curve, but again extend the curve to the right. Since nonvolatile plasticizers are used, they become part of the coating deposited; however, as part of the coating composition they help to solubilize the resin. Plasticizer is especially useful in pigmented coatings in overcoming the increase in viscosity which often accompanies the addition of pigment to the composition. The suitable and preferable plasticizers are described in detail in U.S. Pat. No. 4,064,092, col. 4, line 10-col. 5, line 66, which is hereby incorporated by reference into this application.

The inversion point for curve (4) is roughly 15,000 centipoises; whereas, that of curve (2) is about 30,000 centipoises. The only difference between the compositions represented by these two curves is in the acid content of the resin. The resin for curve (4) has only two parts acrylic acid; whereas, the resin for curve (2) has two parts acrylic and one part methacrylic acid. This downward shift of the curve enhances the advantages previously discussed (i.e. permitting higher total solids). Higher solids concentration not only offers better substrate protection; it also necessarily reduces the amount of organic solvent evaporating per unit weight of coating composition, since percent organic solvent must decrease as percent solids increases.

The research work through which this improvement has been developed has shown that:

(1) Even with this 2-solvent system, there is a limit to the increase in volume percent water, beyond which the resin (even low acid resin) cannot be fully dispersed at a given percent solids. Generally, the highest volume percent water in which resins have been dispersed is 90 percent.

(2) It is easier to disperse the resins at a 30/70 organic solvent/water ratio, and this is the recommended proceedure. The remaining water can be post added.

(3) Some plasticizers were more efficient than others. Surface tension was very critical at high water/solvent volume ratios, and thus an increase in defoamer may help the plasticizer to do its job of lowering the viscosity. Tributoxyethly phosphate is a preferred plasticizer. Other plasticizers found to be useful were: alpha-methylstyrene/styrene copolymer obtained as Dow 276-V2, hydrogenated methyl ester of rosin obtained as Hercolyn D, a trademark of Hercules, Inc., a 40 percent chlorinated paraffin obtained as Chlorowax 40, a trademark of Diamond Alkali Co., and hydrogenated terphenyl, obtained as HB-40, a trademark of Monsanto Industrial Chemicals Co.

(4) The acrylic acid containing resins were more easily dispersed than the others and are therefore preferred.

The following example illustrates the use of the compositions of this invention in highway traffic paints.

EXAMPLE II

The resin selected was one consisting of 71 parts styrene, 27 parts butyl acrylate, and 2 parts acrylic acid (see Run 2058 in Example I). This resin was selected because it is lower in acid than most of the others and permits formulating at higher solids and lower viscosities.

For the traffic paints, modifying resins are used in addition to the water reducible resins described above. These modifying resins are usually lower in molecular weight than the water reducible resins and are used as resin extenders. They are often lower in price than the water reducible resins and therefore have economic advantages. They also can impart properties such as plasticization. An initial screening was conducted in order to determine the compatibility of various plasticizers and modifying resins. Mixtures of various plasticizers and modifying resins (50/50) were made by dissolving each modifying resin in the plasticizer at about 66° C. using a high speed Premier "Dispersator" (Premier Mill Corp., Temple, Pennsylvania, U.S. Pat. No. 2,635,860). Compatibility was mainly judged on the solubility of the modifying resin in the plasticizer and the viscosity of the mixture. The plasticizer should be a solvent for the modifying resin. Some of the combinations gave: viscous liquids, rubbery compositions or hard glass-like compositions. The combinations which are liquids make good coalescing aids as well as modifiers.

A series of paints was made up as follows:

(1) The water reducible resin, pigments, and premixed wetting agent in water, were charged to a pebble mill.

(2) This mixture was rolled for 5–10 minutes to disperse and wet the resin with water.

(3) The modifying resin was dissolved in a mixture of the plasticizer, defoamer, bactericide, ethylene glycol monobutyl ether, and other water insoluble solvent, and possibly another wetting agent and another extender.

(4) Triethylamine (sometimes mixed with ethylene glycol monoethylether) was mixed with the solution in number (3).

(5) The solution from number (4) was added to the pebble mill, and the total mixture was ground and dispersed.

(6) A small amount of water or water mixed with defoamer was added to reduce the viscosity of the mill contents in order to facilitate emptying the mill.

(7) Using a Premier Mixer, a thickener (cellulose derivative) was gradually added to the composition.

Four representative traffic paint compositions are given in Table 4.

TABLE 4
WATER REDUCIBLE TRAFFIC PAINTS
Pebble Mill Preparation

| Formulation | 48B | 50B | 50C | 50E |
|---|---|---|---|---|
| Initial Charge to Mill | | | | |
| Resin | 120 | 120 | 120 | 120 |
| TiO$_2$ | 200 | 200 | 200 | 200 |
| CaCO$_3$ | 100 | 100 | 100 | 100 |
| Talc | 150 | 150 | 150 | 150 |
| MICA | 150 | 150 | 150 | 150 |
| Anionic pigment wetting agent[a] | 8 | 5 | 5 | 5 |
| Water | 260 | 275 | 275 | 275 |
| Modifying Resin Mixture | | | | |
| Plasticizers: | | | | |
| α-methyl styrene/styrene copolymer[b] | | 35 | 35 | |
| Butyl benzyl phthalate | 35 | | | 35 |
| Resin Extenders: | | | | |
| Poly-α-methylstyrene[d] | 35 | | | 35 |
| Styrene/α-methylstyrene Copolymer, melting point 100° C.[c] | | 17.5 | | |
| Copolymer of piperylene (20–80%), 2-Methyl-2-butene (80–20%), and Dicyclopentadiene (5–15%) Softening point 100°–120° C.[f] | | | 35 | |
| Thermoplastic block copolymer rubber derived from styrene-butadiene-styrene block copolymer[g] | | 17.5 | | |
| Defoamer | 3 | 5 | 5 | 5 |
| 2,4,7,9-Tetramethyl-5-decyne-4,7-Diol[i]-wetting agent | | 4 | 4 | 4 |
| Bacteroide #1[j] | 2 | | | |
| Bacterioide #2[k] | | 2 | 2 | 2 |
| Ethylene glycol monobutyl ether | 66 | 25 | 25 | 25 |
| Cyclohexane Hydrocarbon solvent[l](C-7,5–50% aromatic) | | 30 | 30 | 30 |
| Ethylene glycol monoethyl ether | | 15 | 15 | 15 |
| Triethylamine | 5 | 5 | 5 | 5 |
| Added after Milling | | | | |
| Water | 46 | 64 | 64 | 64 |
| Thickener, Post Added | | | | |
| Defoamer[h] | 2 | 2 | 2 | 2 |
| Titanium triethanolamine Chelate | | 4 | 4 | 4 |
| Modified Cellulose[m] | 50 | 25 | 25 | 25 |
| Total Parts | 1245 | 1251 | 1251 | 1251 |

[a] Obtained as Nopcosant L., a trademark of Diamond Shamrock Chemical Co. Premixed with the water before adding to the mill.
[b] Obtained as Dow 276-V2, trademark of Dow Chemical Co.
[c] Obtained as Santicizer 160, a trademark of Monsanto Industrial Chemicals Co.
[d] Obtained as Amoco 18-290, a trademark of Amoco Chemicals Corp.
[e] Obtained as Kristalex 3100, a trademark of Hercules, Inc.
[f] Obtained as Wingtack 115, a trademark of The Goodyear Tire & Rubber Co.
[g] Obtained as Krayton G, a trademark of Shell Chemical Co.
[h] Obtained as Nopco NDW, a trademark of Diamond Shamrock Chemical Co.
[i] Obtained as Surfy-nol 104, a trademark of Airco Chemicals and Plastics.
[j] Obtained as Dowicide-1, a trademark of Dow Chemical Co.
[k] Obtained as Dowicil S-13, a trademark of Dow Chemical Co.
[l] Obtained as Tolu-Sol EC-19, trademark of Shell Chemical Co.
[m] Obtained as Cellosize QP-4400, a trademark of UnionCarbide Corp.

Physical test data for applied coatings using the paints of Table 4 are given in Table 5. The drying times were run by ASTM Test D711.

The abrasion tests were run by ASTM Method D968-51. The numbers recorded are liters of sand which the test coating sustained before failure.

The Taber Wesr Tests were run on a Taber Abraser Model 174 (Standard Abrasion Tester, U.S. Pat. No. 2,287,148) made by the Taber Instrument Corp., North Tonawanda, N.Y. Taber H-22 Wheels loaded with 500 grams were utilized in the tests. The data reported represents grams lost from coated test samples after the stated number of revolutions of the tester.

TABLE 5

| Paint Formulation | 48B | 50B | 50C, | 50E |
|---|---|---|---|---|
| Drying time, minutes | 32 | | | |
| Abrasion (liters of sand) | | | | |
| 2 hours dry time at 107° C. | 36 | | | |
| 3 hours dry time at 107° C. | 25 | | | |
| Taber Wear | | | | |
| 100 revolutions | 0.064 | 0.071 | 0.073 | 0.064 |
| 200 revolutions | 0.110 | 0.132 | 0.130 | 0.121 |

Traffic stripe paints should be able to sustain at least 35 liters of sand in the abrasion test.

A commercial solvent based coating with a vinyl-toluene/butadiene resin (obtained as Pliolite VT, a trademark of The Goodyear Tire & Rubber Company) was tested for comparison purposes. Some of the Pliolite traffic paint was diluted with Tolu-Sd EC-19; and some with toluene. The Taber Wear results for applied coatings made from these controls are shown in Table 6.

TABLE 6
Control-Taber Wear Data

| | |
|---|---|
| Tolu-Sol-EC-19 diluted | |
| 100 revolutions | 0.091 g. lost |
| 200 revolutions | 0.174 g. lost |
| Toluene diluted | |
| 100 revolutions | 0.075–0.080 g. lost |
| 200 revolutions | 0.142–0.148 g. lost |

The Taber Wear results for the compositions of the present invention compare favorably with the results of the control solvent based composition. Drying time for the solvent based composition was only eight minutes. However, a greater drying time is expected for the water reducible compositions since they contain 80 percent and more water in the solvent.

Thus, it has been found that the water reducible compositions of this invention are useful in making paints such as traffic paints. The pigment volume content can be kept unchanged (compared to that of solution based paints) by increasing or reducing the level of plasticizer and modifying resin.

As a result of the experimentation carried on in the course of developing these compositions, it has been found that non-aqueous dispersions may be made with certain of the resins described.

A non-aqueous dispersion is a dispersion of a solid in an organic liquid. The solid can be a fine colloidal particle or a partially dissolved or partially swollen solid. Such mixtures are often translucent or white, not transparent. For a true dispersion to exist, there is no settling of the solid resin. The utility of non-aqueous dispersions is in the formulation of solution or solvent based paint. For a given percent solids, nonaqueous dispersions have a significantly lower viscosity than true solutions. Therefore, organic solvent based paints which are easily applied may be made with much higher solids contents if the paint vehicle is a non-aqueous dispersion as opposed to a resin solution.

The polymers which gave stable non-aqueous dispersions were those containing acrylic acid monomer. Experiments were done mixing several such polymers with xylene (a true organic solvent for the resins) and with 50/50 blends of a water soluble solvent (ethylene glycol-monobutyl ether) and various water insoluble solvents. Those blends using butyl alcohol as the water insoluble solvent resulted in non-aqueous dispersions with markedly lower viscosities than the true solutions in xylene. This is demonstrated by Table 7.

TABLE 7

| Resin Type (from TABLE 1) | 2058 | 2058 | 2048 | 2048 |
|---|---|---|---|---|
| Resin, parts by weight | 25 | 25 | 25 | 25 |
| Xylene | 50 | | 50 | |
| Ethylene glycol monobutyl ether, parts | | 25 | | 25 |
| Butyl alcohol, parts | | 25 | | 25 |
| Solution or dispersion | sol'n. | disp. | sol'n. | disp. |
| Viscosity, centipoise | 1280 | 95 | 1130 | 170 |

Other embodiments of this invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A water reducible composition which comprises on a 100 parts resin basis an aqueous or solution dispersion of a defoamer, volatile components and a resin, said resin consisting essentially on a 100 weight percent basis of polymerized monomeric units, said units being obtained from polymerized monomers in the following percentages: 64.5 to 84.5 percent of a hard hydrophobic enhancing units from monomers selected from the class consisting of styrene, α-methylstyrene, acrylonitrile, vinyl toluene, methyl methacrylate, vinyl chloride and vinylidene chloride; 15 to 35 percent of soft hydrophobic enhancing units from monomers selected from at least one acrylate selected from the class consisting of methyl acrylate, ethyl acrylate, butyl acrylate, 2-ethylhexyl acrylate, lauryl acrylate, isodecyl methacrylate, butyl methacrylate, isobutyl methacrylate, at least one vinyl ether selected from the class consisting of ethyl, butyl, octyl, decyl, and cetyl vinyl ether and/or at least one diene selected from 1,3-butadiene, isoprene and 2,3-dimethyl butadiene, provided that said diene monomers are not mixed together and copolymerized with vinyl chloride or vinylidene chloride; and 0.5 to 10 percent of a hydrophilic enhancing organic acid unit selected from the class consisting of acrylic, methacrylic, fumaric, itaconic and maleic acid, said volatile components comprising a volatile amine in sufficient amount to result in a pH of from 8 to 14 for the composition; a water insoluble organic solvent; and a water soluble solvent selected from the class consisting of ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, dipropylene glycol methyl ether, methyl ethyl ketone, propylene glycol ethyl ether, propylene glycol isopropyl ether, propylene glycol butyl ether, acetone, methyl propyl ketone and diacetone alcohol; the water insoluble organic solvent having a weight ratio of from 70:30 to 20:80 relative to the water soluble organic solvent, and 0 to 30 parts of a plasticizer having a melting point of about −40° C. to about 25° C., a boiling point of at least 95° C., and a solubility parameter of about 8 to about 16, with the proviso that when water is present it is present in a volume ratio relative to the volatile components of at least 80:20.

2. The film forming water reducible composition of claim 1 wherein the volatile amine is selected from the group consisting of primary, secondary, and tertiary amines having a melting point in the range of about −40° to 25° C. and a boiling point in the range of about 50° to about 150° C.

3. The improved water reducible compositions of claim 2 wherein the monomers in the resin are present in the following proportions by weight:

| hard monomer from group A.1. | 71–84.5 |
|---|---|
| soft monomer from group A.2. | 15–27 |
| organic acid from group A.3. | 0.5–2. |

4. The improved water reducible composition of claim 2 wherein the carboxylic acid groups in the resin are at spaced intervals along the resin polymer chain.

5. The improved water reducible composition of claim 2 wherein the volatile amine is selected from the group consisting of ethylamine, propylamine, butylamine, isoamylamine, amylamine, hexylamine, heptylamine, ethanolamine, diethylamine, ethylethanolamine, morpholine, dimethyl ethanolamine, trimethylamine, triethylamine and N-methylmorpholine.

6. The water reducible composition of claim 5 wherein the water soluble solvent of part B is selected from the group consisting of ethylene glycol monobutyl ether, ethylene glycol monoethyl ether, diethylene glycol monomethyl ether, diethylene glycol monoethyl ether, and diethylene glycol monobutyl ether.

7. The water reducible composition of claim 6 wherein the water insoluble organic solvent is selected from the groups consisting of methyl isobutyl ketone, cyclohexane, and a hydrocarbon solvent consisting essentially of C-7 hydrocarbons of which 5–50% are aromatics.

8. The water reducible composition of claim 7 wherein the plasticizer is selected from the group consisting of butyl benzyl phthalate, alpha-methylstyrene/styrene copolymer, hydrogenated methyl ester of rosin, 40% chlorinated paraffin, and hydrogenated terphenyl.

9. The water reducible composition of claim 7 wherein the water insoluble organic solvent is methyl isobutyl ketone and the water soluble organic solvent is ethylene glycol monobutyl ether.

10. The water reducible composition as recited in claim 9 wherein the weight ratio of water insoluble organic solvent to water soluble organic solvent is 50/50.

11. A non-aqueous dispersion comprising:
  A. A resin which consists essentially of, based on 100 weight percent of polymerized monomeric units within the resin,
    1. 64.5–84.5 parts of at least one hard hydrophobic enhancing monomer selected from styrene, alpha-methylstyrene, acrylonitrile, vinyl toluene, methyl methacrylate, vinyl chloride and vinylidene chloride;
    2. 15–35 parts of at least one soft hydrophobic enhancing monomer selected from at least one acrylate selected from methyl acrylate, ethyl acrylate, butyl acrylate, 2-ethylhexyl acrylate, lauryl acrylate, isodecyl methacrylate, butyl methacrylate, isobutyl methacrylate, at least one vinyl ether selected from ethyl, butyl, octyl, decyl, and cetyl vinyl ether and/or at least one diene selected from 1,3-butadiene, isoprene and 2,3-dimethyl butadiene, provided that said dienes of monomer part (2) are not mixed together and copolymerized with vinyl chloride or vinylidene chloride;
3. 0.5 to 10 parts of at least one hydrophilic enhancing organic acid selected from acrylic, methacrylic, fumaric, itaconic and maleic acids with the proviso that acrylic acid must be utilized; and
B. A blend of n-butyl alcohol and ethylene glycol monobutyl ether in about a 50/50 weight ratio.

* * * * *

UNITED STATES PATENT OFFICE
CERTIFICATE OF CORRECTION

PATENT NO. : 4230609
DATED : October 28, 1980
INVENTOR(S) : Gary L Burroway, et. al.

It is certified that error appears in the above-identified patent and that said Letters Patent are hereby corrected as shown below:

In Column 9, Table 3 beginning title "Solids (grams/50cc)" change 24-25.15 to read 25-25.15

In Column 9, Line 16, delete than and insert that

Signed and Sealed this

Twenty-ninth Day of December 1981

[SEAL]

Attest:

GERALD J. MOSSINGHOFF

Attesting Officer   Commissioner of Patents and Trademarks

UNITED STATES PATENT OFFICE
CERTIFICATE OF CORRECTION

PATENT NO. : 4,230,609
DATED : October 28, 1980
INVENTOR(S) : Gary L. Burroway and Michael J. Maximovich It is certified that error appears in the above-identified patent and that said Letters Patent are hereby corrected as shown below:

Col. 9, Line 66 -- Tributoxyethly to be deleted and Tributoxyethyl to be inserted.

Col. 11, Line 29 -- 15 to be inserted for Cyclohexane in column 48B of Table 4.

Col. 11, Line 58 -- Wesr to be deleted and Wear to be inserted.

Signed and Sealed this

Twenty-fourth Day of August 1982

[SEAL]

Attest:

GERALD J. MOSSINGHOFF

Attesting Officer     Commissioner of Patents and Trademarks